United States Patent [19]

Vivarelli

[11] Patent Number: 4,524,922

[45] Date of Patent: Jun. 25, 1985

[54] FISHING REEL WITH OSCILLATING MOVEMENT ACTUATING LEVER

[76] Inventor: Franco Vivarelli, Via Beniamino Gigli 7, Bologna, Italy

[21] Appl. No.: 463,362

[22] Filed: Feb. 3, 1983

[30] Foreign Application Priority Data

Feb. 15, 1982 [IT] Italy ............................ 3337 A/82

[51] Int. Cl.³ .............................................. A01K 89/00
[52] U.S. Cl. .................................. 242/84.1 R; 74/30; 242/217
[58] Field of Search ............... 242/84.1 R, 84.3, 217, 242/96; 74/30, 32, 89, 89.17, 89.18, 89.19, 21

[56] References Cited

U.S. PATENT DOCUMENTS

2,428,908 10/1947 Cooper et al. ................. 242/84.1 R
2,593,700 4/1952 Rosner ............................... 242/219

FOREIGN PATENT DOCUMENTS

2497064 7/1982 France ........................ 242/84.1 R
561010 5/1944 United Kingdom ............... 242/217

*Primary Examiner*—Billy S. Taylor
*Attorney, Agent, or Firm*—Guido Modiano; Albert Josif

[57] ABSTRACT

The invention relates to a fishing reel. It comprises a fishing line storage spool which is driven rotatively by an oscillating movement lever through a gear which includes a one-way coupling, whereby the lever is allowed to return to its initial position at the end of the power stroke. The spool is rotatively coupled to the gear through a torque limiter which also allows the spool to rotate independently of the operation of the lever.

1 Claim, 2 Drawing Figures

FISHING REEL WITH OSCILLATING MOVEMENT ACTUATING LEVER

BACKGROUND OF THE INVENTION

This invention relates to a fishing reel. The invention is specially useful in association with fishing rods intended for "fly" casting, wherein a fishing line called "rat tail" is used which characteristically tapers toward the line working end.

SUMMARY OF THE INVENTION

It is a primary object of this invention to provide a fishing reel which can fully meet the requirements of the above indicated particular angling form, it affording fast line recovering features, and on casting, gentle lowering of the line onto the water surface.

Moreover, this fishing reel is of simple construction and, hence, economically advantageous, as well as reliable in operation.

These objects are achieved by a fishing reel comprising a box-like housing provided with a means of attachment to a fishing rod, a line storage spool supported rotatably in said housing, a manually operated lever pivoted for oscillation in said housing and being movable against elastic bias means, a gear segment associated with said lever and a gear wheel associated coaxially with said spool with the interposition of a torque limiter, between said gear segment and said gear wheel there intervening a gear comprising a one-way coupling acting in the line winding direction.

BRIEF DESCRIPTION OF THE DRAWINGS

Further advantages of this invention will be apparent from the following detailed description of an embodiment thereof, as illustrated in the accompanying drawings, where.

DESCRIPTION OF THE PREFERRED EMBODIMENT

Figure 1:
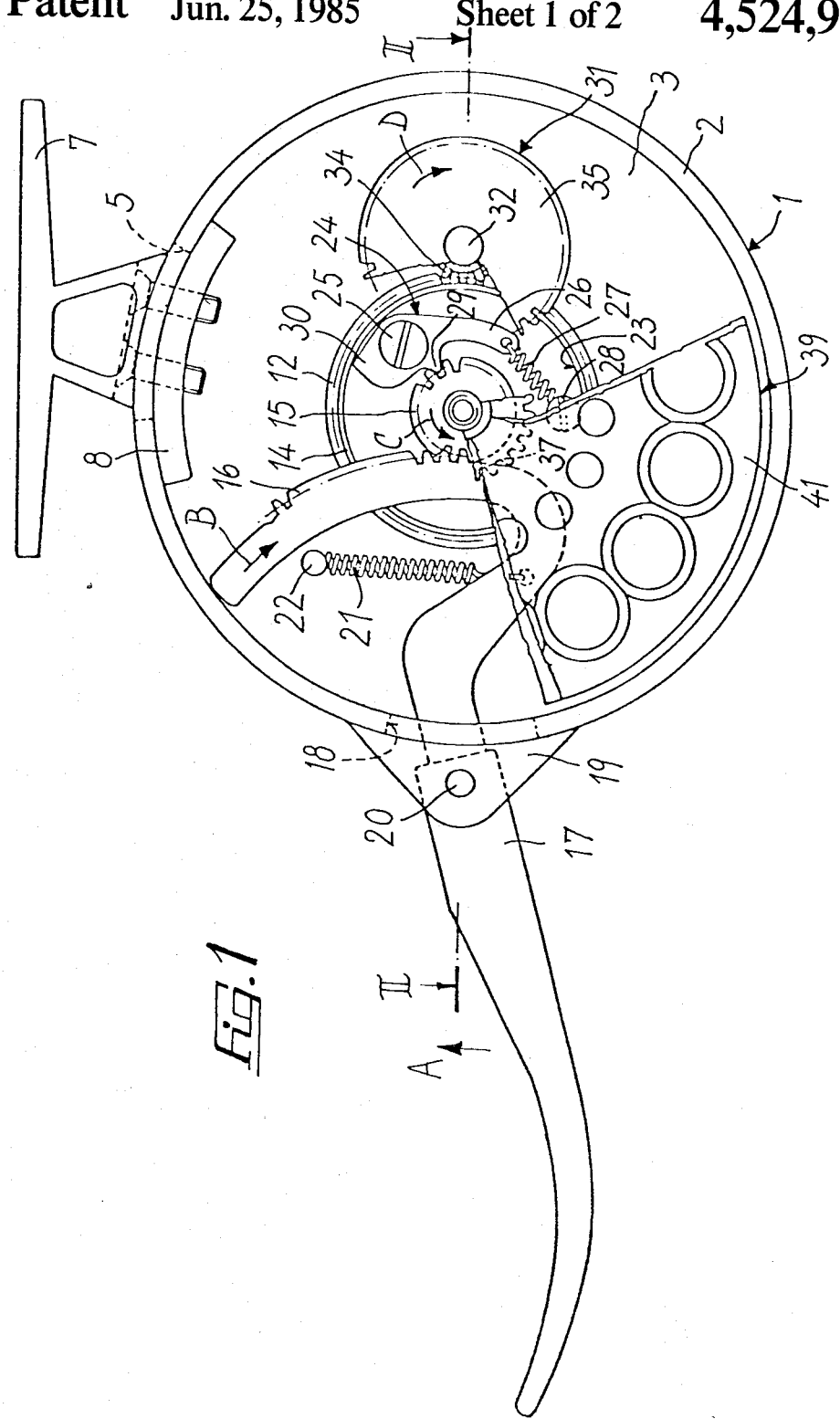
FIG. 1 is a side elevation view of this fishing reel, cut away to better show some constructional details thereof.
Figure 2:
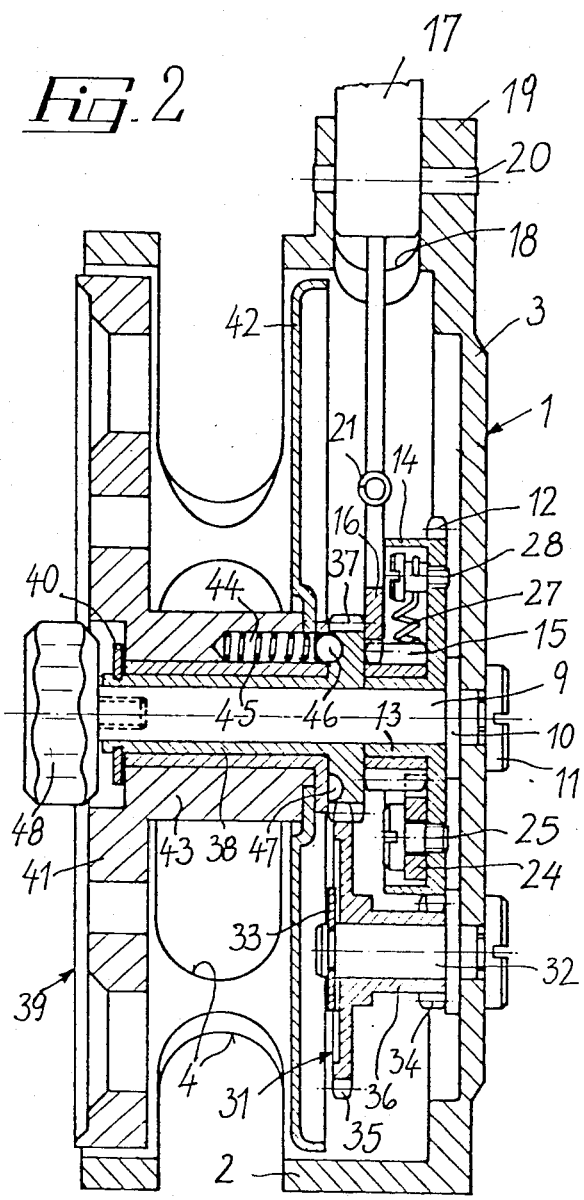
FIG. 2 is a sectional view taken along the line II—II of FIG. 1.

Making reference to the drawing figures, indicated at 1 is a cylindrical case, which comprises a cylindrical wall 2 and flat wall 3 forming the case bottom. Formed peripherally along the cylindrical wall are elongate apertures 4 and a slot 5, wherethrough there engage two screws 6 for fastening a support 7 intended for attaching the case to a fishing rod. The screws 6 are threaded into a suitably arcuate plate 8 resting on the inner face of the wall 2.

The slot 5 has an oblong shape to allow the support 7 to be displaced relatively to the case, and for a more convenient operation of the reel, as will be explained hereinafter.

Formed at the center of the bottom 3 is a hole wherethrough the end of a small shaft 9 is inserted to abut against a collar 10. The shaft 9 extends coaxially with the case and is secured by means of a screw 11.

Carried rotatably on the shaft 9 is a gear wheel 12, which has a centrally located bushing 13 and a peripheral circular flange 14.

Rotatable on the bushing 13 is a pinion gear 15 meshing with a gear segment 16 carried on a lever 17. The latter protrudes out of the case 1 through an aperture 18 in the wall 2 and is pivoted in ears 19, formed on the exterior of the case, by means of a pin 20.

The gear segment 16 has a radius of curvature equal to the distance separating the pin 20 from the tangent point of the gear segment 16 to the pinion gear 15.

The lever 17 has a portion located externally to the case which is shaped to facilitate gripping by the user's hand. Hooked to the lever portion inside the case is the end of a spring 21, the other end whereof is hooked to a small pin 22 projecting from the bottom 3. The spring 21 is a tension one opposing the user's action such that, as the latter is removed, the lever 17 is held in a home position wherein the gear segment 16 bears on the wall 2.

Between the pinion gear 15 and flange 14, there is defined a space 23 accommodating a one-way coupling adapted to rotatively connect together, but in one direction only, the gear wheel 12 and pinion 15.

Said one-way coupling comprises a pawl 24 pivoted to the gear wheel by means of a screw 25 and having a lug 26, whereto the end of a tension spring 27 is attached, the opposite end whereof is secured to the gear wheel 12 by a screw 28.

The pawl 24 also includes an inside tooth 29 adapted to engage between the teeth of the pinion gear 15, as well as a shoe 30 diametrically opposite the lug 26, with respect to the pivot 25. It should be noted that, by operating the lever in the direction A, the gear segment 16 is moved in the direction B, thereby the pinion gear 15 will turn in the direction C. In this condition, the tooth 29 of the pawl is entrained between the pinion gear teeth, where it stays owing to the shoe 30 engaging with the flange 14 which prevents its further oscillation. Thus, a rotary coupling is created between the pinion gear 15 and gear wheel 12 on which the pawl 24 is mounted. By converse, if the lever 17, owing to the action of the spring 21, is returned to the initial position, the pinion gear 15 would be rotated in the opposite direction to C, thereby the pawl 24 would be enabled to oscillate and permit disengagement of the tooth 29 from the pinion gear, and hence rotation of the latter with respect to the gear wheel 12.

The gear wheel 12 is in constant mesh with a gear 31 carried rotatably on a pin 32 attached to the bottom 3 of the case, in the same way as the shaft 9 is attached, and retained there by a ring 33.

The gear 31 comprises a pinion gear 34 and a gear wheel 35 made rigid with a tube 36 rotatable on the pin 32. The gear wheel 35 meshes with an additional gear wheel 37 which is supported rotatably on the small shaft 9. The gear wheel 37 is provided with a sleeve 38 which extends on the shaft 9 and on which is mounted a line storage spool 39.

The spool 39 is retained on the sleeve 38 by a ring 40 inserted in an annular groove on the sleeve.

The spool 39 comprises two disk-like flanges 41, 42 which are rigidly attached to a central hub 43. The flange 41 functions as the front closure of the case 1.

Formed through the central hub 43 is an axial bore 44 open toward the gear wheel 37, wherein a compression spring 45 is accommodated which acts on a small ball 46 to hold it in engagement with any of a plurality of notches 47 formed on the adjoining face of the gear wheel 37 and arranged concentrically with respect to the shaft 9. The ball 46 forms a torque limiter of sort which allows the spool 39 to rotate relatively to the gear wheel 37 upon the applied torque therebetween exceeding a preset value.

The spool 39 and gear wheel 37 form a unitary assembly which may be slipped off the shaft 9 or held thereon by means of a ring nut 48 having a threaded shank which is threaded axially into the end of the shaft 9.

The operation of this fishing reel is evident from the foregoing description. In fact, by operating the lever in the direction A, the pinion gear 15 is caused, as specified hereinabove, to rotate in the direction C, and accordingly through the pawl, the gear wheel 12 is also rotated in the direction C.

The motion is transmitted from the latter, through the gear 31 which turns in the direction D, to the gear wheel 37 which will be turning in the direction C.

The rotary connection between the gear wheel 37 and spool 39 established by the ball 46 also produces rotation of the spool and line recovery.

As the lever reaches the end of its oscillation, it is released, so that owing to the action of the spring 21, it is returned to the initial position. However, it should be noted that, during that lever return stroke, the pinion gear 15 is rotated in the opposite direction to C due to the engagement with the gear segment 16. Thus, the pawl 24 is enabled to pivot against the bias of the spring 27 and permit the tooth 29 to disengage from the pinion 15. The gear wheel 12 is, therefore, disengaged from the pinion gear 15 and allowed to continue rotating under the previously applied momentum.

The operation repeats itself as described hereinabove each time that the lever 17 is operated.

When the line is instead to be unwound manually, a pull is applied thereto so as to bring the spool to a rotary movement in the opposite direction to C. Since the pawl 24 maintains the rotary coupling between the pinion gear 15 and gear wheel 12, and the gear segment 16 rests against the wall 2 of the case, the spool rotation only occurs with respect to the gear wheel 37. In fact, as the spool 39 is forced relatively to the gear wheel 37, the ball 46 can re-enter the hole 44, overcoming the bias force of the spring 45.

It should be noted that the fishing line is wound much faster than with traditional reels having a crank and reciprocating spool.

Another important advantage of the inventive fishing reel is that the line is wound and unwound without undergoing twist in the lengthwise direction, which, as is known, could result in line entanglement.

Furthermore, the provision for turning the case relatively to the support 7 allows the distance of the lever 17 from the fishing rod to be adjusted, thus affording a more convenient operation by the user.

I claim:

1. A fishing reel comprising a case provided with means for attachment to a fishing rod, a shaft rigidly secured in said case, a gear wheel and a line storage spool rotatably carried on said shaft, a torque limiter for rotatably connecting said gear wheel with said spool, a manually operable lever pivoted for oscillation in said case, a gear segment associated with said lever and gear means connecting said gear segment with said gear wheel for driving the spool in line winding direction when the lever is actuated, said gear means including a one-way coupling acting in line winding direction, wherein according to the improvement said gear means comprise a second gear wheel rotatably supported on said shaft and having a central bushing extending on said shaft, a pinion rotatably supported on said bushing and meshing with said gear segment, a flange peripherally formed on said second gear wheel and surrounding said pinion so as to define a space herewith, a pawl pivoted on said second gear wheel inside said space and having a tooth facing said pinion and a shoe portion, and a spring acting on said pawl to hold said shoe portion in abutment on said peripheral flange and the tooth in engagement between the teeth of the pinion when the spool is driven in line winding direction.

* * * * *